(12) United States Patent
Fujimura (10) Patent No.: US 11,495,235 B2
(45) Date of Patent: Nov. 8, 2022

(54) SYSTEM FOR CREATING SPEAKER MODEL BASED ON VOCAL SOUNDS FOR A SPEAKER RECOGNITION SYSTEM, COMPUTER PROGRAM PRODUCT, AND CONTROLLER, USING TWO NEURAL NETWORKS

(71) Applicant: KABUSHIKI KAISHA TOSHIBA, Tokyo (JP)

(72) Inventor: Hiroshi Fujimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 200 days.

(21) Appl. No.: 16/296,410

(22) Filed: Mar. 8, 2019

(65) Prior Publication Data
US 2019/0392839 A1 Dec. 26, 2019

(30) Foreign Application Priority Data
Jun. 21, 2018 (JP) .............................. JP2018-118090

(51) Int. Cl.
*G10L 17/18* (2013.01)
*H04N 21/2347* (2011.01)
(Continued)

(52) U.S. Cl.
CPC ................ *G10L 17/00* (2013.01); *G06N 3/08* (2013.01); *G10L 15/075* (2013.01); *G10L 15/16* (2013.01); *G10L 17/18* (2013.01)

(58) Field of Classification Search
CPC . G10L 15/16; G10L 2015/088; G10L 17/005; G10L 17/04; G10L 17/18;
(Continued)

(56) References Cited

U.S. PATENT DOCUMENTS

| | | | | |
|---|---|---|---|---|
| 5,737,485 | A | * | 4/1998 | Flanagan ................ G10L 15/16 704/232 |
| 9,230,550 | B2 | | 1/2016 | Hosom et al. |

(Continued)

FOREIGN PATENT DOCUMENTS

| | | |
|---|---|---|
| JP | 2016-509254 A | 3/2016 |
| JP | 2016-177474 A | 10/2016 |
| JP | 2016-538658 A | 12/2016 |

OTHER PUBLICATIONS

S. Shiota et al., "i-vector generation based on moment-matching networks for speaker verification," The Journal of Acoustical Society of Japan, Mar. 2018, pp. 35-36.
(Continued)

*Primary Examiner* — Farzad Kazeminezhad
(74) *Attorney, Agent, or Firm* — Finnegan, Henderson, Farabow, Garrett & Dunner, LLP (57) ABSTRACT

According to one embodiment, a system for creating a speaker model includes one or more processors. The processors change a part of network parameters from an input layer to a predetermined intermediate layer based on a plurality of patterns and inputs a piece of speech into each of neural networks so as to obtain a plurality of outputs from the intermediate layer. The part of network parameters of the each of the neural networks is changed based on one of the plurality of patterns. The processors create a speaker model with respect to one or more words detected from the speech based on the outputs.

16 Claims, 7 Drawing Sheets

(51) Int. Cl.
  *G06K 9/62* (2022.01)
  *G10L 15/16* (2006.01)
  *G10L 17/00* (2013.01)
  *G06N 3/08* (2006.01)
  *G10L 15/07* (2013.01)

(58) Field of Classification Search
  CPC ....... G10L 17/24; G10L 17/26; G06N 3/0454; G06N 3/0481; G06N 7/005; H04N 21/23476; G06K 9/624
  USPC .................. 704/243, 246, 250, 232
  See application file for complete search history.

(56) References Cited

U.S. PATENT DOCUMENTS

| | | | |
|---|---|---|---|
| 9,343,068 | B2 | 5/2016 | Yun et al. |
| 9,824,692 | B1 * | 11/2017 | Khoury .................. G10L 15/16 |
| 11,114,088 | B2 * | 9/2021 | Shastry .................. G10L 17/04 |
| 2005/0149462 | A1 * | 7/2005 | Lee ........................ G06K 9/624 |
| | | | 706/20 |
| 2015/0081295 | A1 | 3/2015 | Yun et al. |
| 2016/0275405 | A1 | 9/2016 | Nasu |
| 2016/0293167 | A1 * | 10/2016 | Chen ................ H04N 21/23476 |

OTHER PUBLICATIONS

Variani, E., et al., "Deep Neural Networks For Small Footprint Text-Dependent Speaker Verification", IEEE, International Conference on Acoustic, Speech and Signal Processing (ICASSP), pp. 4080-4084 (2014).

Snyder, D., et al., "X-Vectors: Robust DNN Embeddings For Speaker Recognition", IEEE, International Conference on Acoustic, Speech and Signal Processing (ICASSP), 5 pages (2018).

* cited by examiner

SYSTEM FOR CREATING SPEAKER MODEL BASED ON VOCAL SOUNDS FOR A SPEAKER RECOGNITION SYSTEM, COMPUTER PROGRAM PRODUCT, AND CONTROLLER, USING TWO NEURAL NETWORKS

CROSS-REFERENCE TO RELATED APPLICATIONS

This application is based upon and claims the benefit of priority from Japanese Patent Application No. 2018-118090, filed on Jun. 21, 2018; the entire contents of which are incorporated herein by reference.

FIELD

Embodiments described herein relate generally to a system for creating a speaker model, a recognition system, a computer program product, and a controller.

BACKGROUND

There have been developed various kinds of apparatuses that have a speaker recognition function of detecting a keyword from speech of users and specifying, among speakers having registered about the detected keyword, which speaker utters the keyword. By registering a keyword with speech of a user and simply uttering the keyword, a user enables an apparatus to recognize the user and to operate desirable operation along with the user. In addition, it is reported that speaker recognition using a neural network operates with a high degree of accuracy. However, speaker recognition using a conventional neural network has required preparation for much input speech (utterance) for registration processing (enrollment) of a speech keyword of a speaker.

DETAILED DESCRIPTION

According to one embodiment, a system for creating a speaker model includes one or more processors. The processors change a part of network parameters from an input layer to a predetermined intermediate layer based on a plurality of patterns and inputs a piece of speech into each of neural networks so as to obtain a plurality of outputs from the intermediate layer. The part of network parameters of the each of the neural networks is changed based on one of the plurality of patterns. The processors create a speaker model with respect to one or more words detected from the speech based on the outputs Preferable embodiments of a system for creating a speaker model, a recognition system, and a computer program product will now be described in detail with reference to the accompanying drawings.

First Embodiment

A specific example of a conventional speaker recognition technique is described. For example, in Japanese National Publication of International Patent Application No. 2016-509254 (Patent Literature 1), there has been developed a method for creating and learning, when an apparatus creates a speaker model from keyword speech of a speaker (speech in which a keyword to be detected is uttered), an output node of a new neural network for each speaker using registered keyword speech of a plurality of speakers and calculating and recognizing likelihood of a speaker using a network parameter for each speaker at the time of recognition. This method enables calculation of phonological likelihood necessary for keyword detection and the like and recognition of a speaker to be performed at the same time using a neural network. However, in this method, a parameter of a neural network increases whenever a speaker is registered, and a calculation amount increases. In addition, it is necessary to use keyword speech of a plurality of speakers at the same time.

In a technique of David Snyder, Daniel Garcia-Romero, Gregory Sell, Daniel Povey, Sanjeev Khudanpur, "X-VECTORS: ROBUST DNN EMBEDDINGS FOR SPEAKER RECOGNITION," in Proc. ICSASP, 2018 (Non Patent Literature 2), simulation speech is created by superimposing noise sound of predetermined music and the like on or convoluting echo on keyword speech, and robustness of speaker registration is improved by creating a speaker recognition feature using a neural network. However, in this method, changes due to predetermined noise and echo are given, and the changes may cause unnatural speech to be created with respect to input speech in which noise and echo are originally generated. In addition, it is necessary to store a noise file in which superimposed noise is defined and the like. Furthermore, it is necessary to recreate speech data, thereby reducing efficiency of speaker registration.

In the speaker recognition based on a keyword using a neural network, a plurality of neural networks are used for performing phonological recognition (detection of a keyword) and speaker recognition at the same time. Thus, using the neural networks causes a calculation amount to increase and also causes a problem in efficiency of speaker registration.

A recognition system according to a first embodiment uses outputs from a predetermined intermediate layer in a neural network specialized for keyword detection as a feature for recognizing a speaker (speaker recognition feature). In addition, by changing a part of network parameters from an input layer to the intermediate layer in this neural network with a plurality of patterns, the recognition system extends a feature for a piece of input speech to a plurality of features, and uses the extended features so as to create a model for recognizing a speaker (speaker model). At the time of recognition, the recognition system defines, while inputting input speech to be recognized to a neural network and detecting a keyword, outputs from the intermediate layer as a feature of speaker recognition and recognizes a speaker using the feature and the speaker model.

In this manner, speaker registration can be effectively executed with less data. In addition, only one neural network for detecting a keyword can be used, and detection of various kinds of keywords and speaker recognition with respect to the keywords can be implemented with a smaller calculation amount.

A system may be implemented as a system for creating a speaker model that does not include a recognition function but includes a function of creating a speaker model. Examples of a speaker may include not only persons but also animals and sound sources such as devices uttering speech (including robots).

The first embodiment shows an example where a recognition system is implemented as physically one apparatus such as a portable cellular phone, a portable terminal, and a personal computer.

Figure 1:
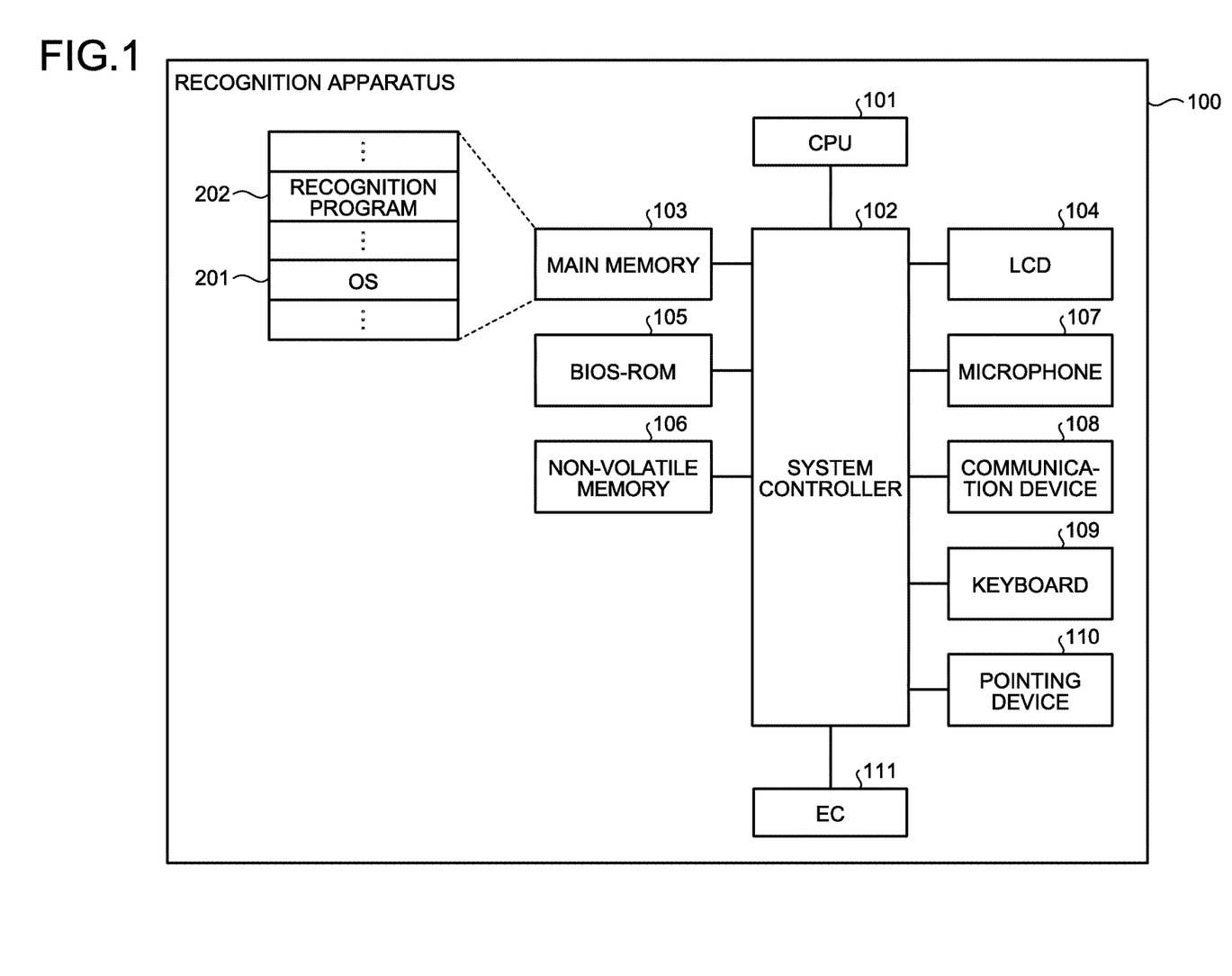
FIG. 1 is a block diagram illustrating a recognition system according to a first embodiment.

FIG. 1 is a block diagram illustrating an example of the system configuration of a recognition apparatus 100 as a recognition system according to a first embodiment. The recognition apparatus 100 includes a central processing unit (CPU) 101, a system controller 102, a main memory 103, a liquid crystal display (LCD) 104, a basic input output system-read only memory (BIOS-ROM) 105, a non-volatile memory 106, a microphone 107, a communication device 108, a keyboard 109, a pointing device 110, an embedded controller (EC) 111, and the like.

The CPU 101 is a processor that controls operation of various kinds of components in the recognition apparatus 100. The CPU 101 executes various kinds of computer programs that are loaded from the non-volatile memory 106 serving as a storage device to the main memory 103. These computer programs include an operating system (OS) 201 and various kinds of application programs. The application programs include a recognition program 202. The recognition program 202 includes an instruction group for recognizing a speaker from speech data.

The CPU 101 also executes a basic input output system (BIOS) stored in the BIOS-ROM 105. The BIOS is a computer program for controlling hardware.

The system controller 102 is a device that connects between a local bus of the CPU 101 and various kinds of components. The system controller 102 has a built-in memory controller that controls access to the main memory 103. The system controller 102 also has a built-in display controller that controls the LCD 104 used as a display monitor of the recognition apparatus 100. A display signal generated by this display controller is sent to the LCD 104. The LCD 104 has a screen image displayed thereon based on the display signal.

The system controller 102 also has a built-in audio codec. The audio codec is configured to control the microphone 107. The audio codec generates a speech signal (data string representing a digitally processed speech waveform, hereinafter, which will be referred to as a speech waveform) based on speech collected by the microphone 107.

The communication device 108 is a device that is configured to execute at least one of the wire communication and wireless communication. The communication device 108 includes a transmitting unit that transmits a signal and a receiving unit that receives a signal.

The keyboard 109 and the pointing device 110 are devices such as a mouse, a touch-pad, and a touch panel for input of a user. The pointing device 110 is a device for detecting a point and movement of the point on a screen of the LCD 104.

The EC 111 is a one-chip microcomputer that includes an embedded controller for power management. The EC 111 has a function of turning on or off the recognition apparatus 100 depending on user's operation of a power button.

The recognition apparatus 100 having the above configuration retrieves a speech part of a keyword to be detected from a speech waveform, and recognizes a speaker that utters the keyword to be detected using the retrieved speech part. A device equipped with this recognition apparatus 100 is equipped with an application that performs operation depending on a recognized speaker. In this manner, as the recognition apparatus 100 mounted on a device that receives speech of a speaker and operates, an apparatus that always receives speech, detects a keyword, is required to accurately recognize a speaker with respect to the detected keyword, and operates on low power and with a low calculation amount is desirable. The number of speaker utterances to a keyword for a registration needs to be reduced so that a user operates a device comfortably without feeling any stress.

Figure 2:
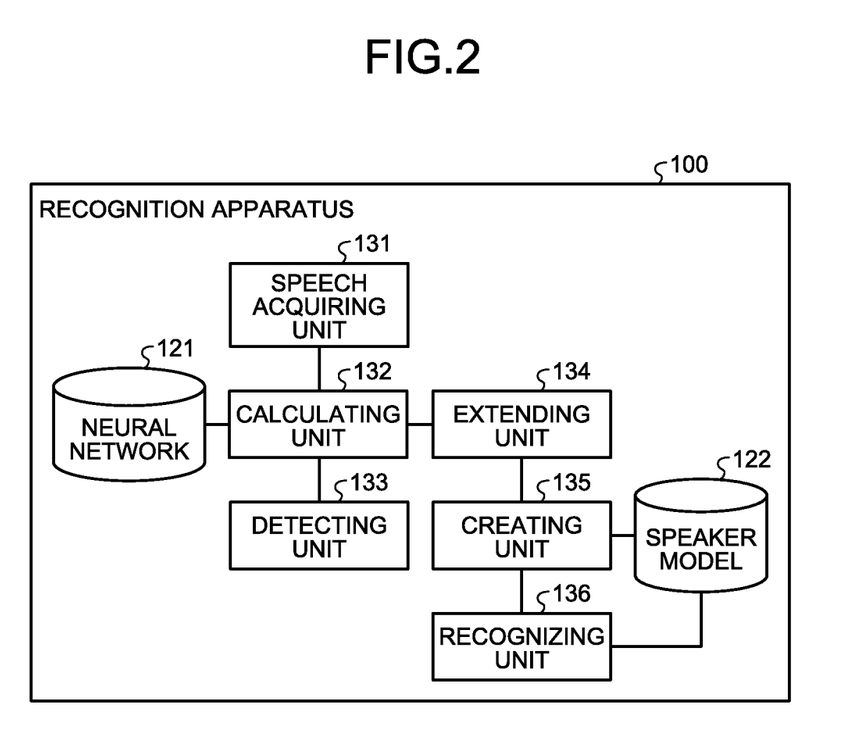
FIG. 2 is a block diagram illustrating a recognition apparatus according to the first embodiment.

The following describes an example of the functional configuration of the recognition apparatus 100. FIG. 2 is a block diagram illustrating an example of the functional configuration of the recognition apparatus 100 according to the first embodiment. As illustrated in FIG. 2, the recognition apparatus 100 includes storages 121 and 122, a speech acquiring unit 131, a calculating unit 132, a detecting unit 133, an extending unit 134, a creating unit 135, and a recognizing unit 136.

The storages 121 and 122 are storage apparatuses that store therein a neural network and a speaker model, respectively. The storages 121 and 122 can be formed of any kind of storage medium that is generally used such as a flash memory, a memory card, a random access memory (RAM), a hard disk drive (HDD), and an optical disk. The storages 121 and 122 may be physically different storage media, and may be implemented as different storage areas in physically the same storage medium. Furthermore, each of the storages 121 and 122 may be implemented by a plurality of physically different storage media. A neural network is one of the mathematical models, and is used for adjusting parameters (weight, bias, and the like) with learning and for recognizing speech, for example.

The speech acquiring unit 131 acquires speech data (input speech) to be processed. For example, the speech acquiring unit 131 receives speech, and converts the received speech into a feature and outputs the feature.

The calculating unit 132 inputs a feature to a neural network, and calculates a score that represents likelihood indicating whether the feature corresponds to a predetermined word. A word is a unit of a phoneme, a syllabic sound, and the like that are extracted from speech, and, hereinafter, may be referred to as a keyword. For example, only vowel sounds included in speech of a recognized speaker may be extracted and an extracted result may be recognized as a keyword.

The detecting unit 133 detects, using a calculated score, one or more keywords that are preliminarily defined from input speech. For example, the detecting unit 133 compares a calculated score with a threshold defined for each keyword, and detects, when the calculated score exceeds the threshold, a keyword corresponding to the threshold.

The extending unit 134 performs processing for extending data used for creating a speaker model. For example, the extending unit 134 changes a part of the network parameters from an input layer to a predetermined intermediate layer in a neural network based on a plurality of patterns, and inputs a piece of input speech to each of the changed neural networks corresponding to the patterns so as to obtain a plurality of outputs from the intermediate layer. In this manner, a plurality of data (output from the intermediate layer) used for creating a speaker model can be obtained for a piece of input speech.

A method for changing network parameters through the extending unit 134 may be any method. For example, the extending unit 134 may change weight of a part of the network parameters in the respective layers from an input layer to intermediate layers. The extending unit 134 may change network parameters by adding a random value to a part of bias among the network parameters in the respective layers from an input layer to intermediate layers. The extending unit 134 may add a bias term to an activating function such as a sigmoid function used for a neural network and then add a random value to the bias term added to the activating function, or may add a bias term to an input value to the respective layers and then add a random value to the bias term added to the input value.

A predetermined intermediate layer may be any intermediate layer among the intermediate layers in a neural network. When noise remains in intermediate layers close to an input layer, an intermediate layer after these intermediate layers may be defined as a predetermined intermediate layer. When features of a speaker do not appear in intermediate layers close to an output layer, an intermediate layer before these intermediate layers may be defined as a predetermined intermediate layer.

A neural network that the extending unit 134 extends may be the same as a neural network that the calculating unit 132 uses for calculating a score, and may be different from the neural network.

The creating unit 135 creates a speaker model using extended data. For example, the creating unit 135 creates a speaker model with respect to a detected keyword based on a plurality of outputs each output from intermediate layers in a plurality of neural networks where network parameters are changed. A speaker model may be in any form. The creating unit 135 may create, for example, Gaussian distribution represented by a mean and variance of a plurality of outputs as a speaker model. The creating unit 135 may create a speaker model from learning in which one or more input speech of speakers and a plurality of outputs corresponding to the input speech are used. The creating unit 135 may create a speaker model for each partial section included in a keyword. Examples of the partial section include a vocal sound and a phoneme forming a keyword.

The recognizing unit 136 recognizes a speaker using a speaker model. For example, the recognizing unit 136 recognizes a speaker by inputting outputs from an intermediate layer with respect to input speech input for recognition to a created speaker model.

Each of the units described above (the speech acquiring unit 131, the calculating unit 132, the detecting unit 133, the extending unit 134, the creating unit 135, and the recognizing unit 136) is implemented by, for example, one or a plurality of processors. For example, the units described above may be implemented by causing a processor such as a central processing unit (CPU) to execute a computer program, in other words, software. The units described above may be implemented by a processor such as a dedicated integrated circuit (IC), in other words, hardware. The units described above may be implemented with a combination of software and hardware. When a plurality of processors are used, each processor may implement one unit out of the units, and may implement two or more units out of the units.

Figure 3:
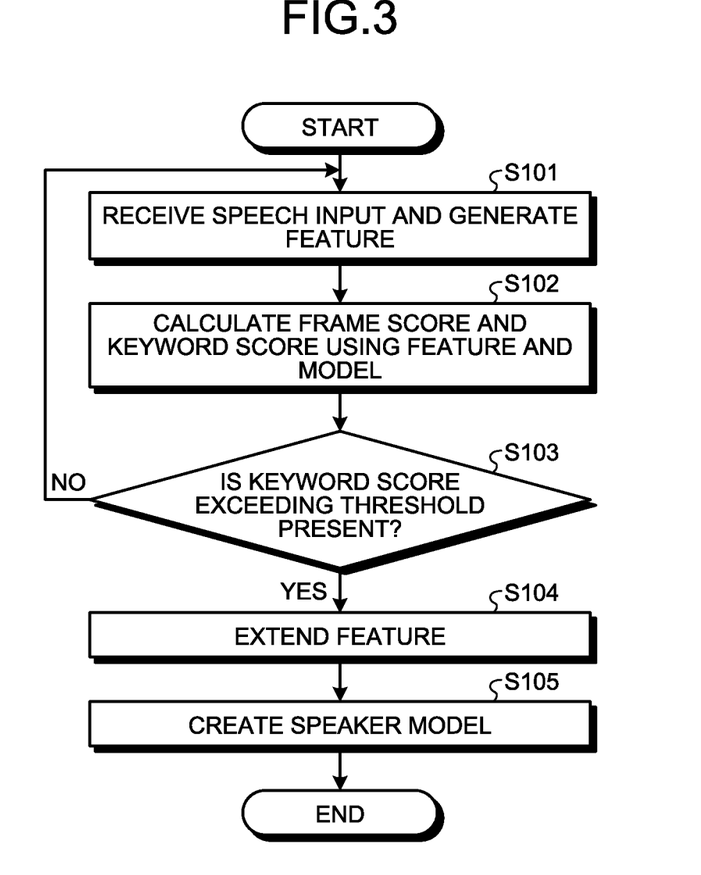
FIG. 3 is a flowchart of processing for creating a model according to the first embodiment.

The following describes processing for creating a model performed by the recognition apparatus 100 according to the first embodiment formed in this manner. FIG. 3 is a flowchart illustrating an example of the processing for creating a model according to the first embodiment. The processing for creating a model corresponds to speaker registration in which a speaker is registered using a keyword detected from speech of a speaker.

The speech acquiring unit 131 receives input of speech data, and generates and outputs a feature of the received speech (step S101). For example, the speech acquiring unit 131 calculates, from 256 samples of speech data, a 12-dimensional mel frequency cepstrum coefficient (MFCC) feature. The speech acquiring unit 131 buffers this MFCC feature for three frames, and outputs a 36-dimensional feature to which the MFCC feature for three frames is connected as a feature of a time of a central frame in these three frames.

The extracted feature is not limited to the MFCC feature, and, for example, a mel-filter bank feature, perceptual linear prediction (PLP), a relative spectral-perceptual linear prediction (RASTA-PLP) feature, and a pitch feature, and also a delta ($\Delta$) component of these features, and a delta-delta ($\Delta\Delta$) component may be used for the extracted feature. A combination of these features may be used for the extracted feature. The number of connection frames is not limited to three, and any number of connection frames may be connected if the number of connection frames is equal to or greater than one. A clipping sample size and a frame period are not limited to the values described above.

Subsequently, the calculating unit 132 receives a feature generated by the speech acquiring unit 131, and calculates, using this feature and a neural network, a frame score and a keyword score (step S102). A frame score is appearance probability of a phoneme for each frame (acoustic score). A keyword score represents likelihood indicating whether the feature corresponds to a predetermined keyword to be detected.

The following describes a specific example when a keyword to be detected is "communication". There are many methods for calculating, using a keyword model with respect to this keyword, an accumulative score with respect to a vector sequence that indicates a feature clipped for each frame. The following describes an example where a left-to-right hidden Markov model (HMM) and a method in Japanese Patent Laid-open No. 2016-177474 (Patent Literature 2) are applied.

A keyword to be detected is defined as a keyword w. The keyword is represented by a left-to-right phonemic HMM. In the phonemic HMM, each phoneme included in phonemic characters (string) "kamyunikeisyon" each representing the keyword w is defined as one state. As a parameter of the phonemic HMM, with regard to transition probability between phonemes, any transition has the same probability. Output probability is represented by appearance probability of a phoneme for each frame (acoustic score).

As a model for calculating an acoustic score (frame score) for each frame, a feedforward neural network common to a plurality of keywords is defined. A frame score is calculated using a method in Patent Literature 2.

An output layer in a neural network for calculating an acoustic score is formed of 10 output units by adding a phoneme "sil" with respect to a silent section to the phoneme representing the keyword w "kamyunikeisyon". An input layer is formed of 36 input units corresponding to a calculated feature. Intermediate layers are what three layers each having 256 units are superimposed. A neural network uses reading-aloud speech of the keyword w including a silent section and performs learning using back propagation.

In this manner, the calculating unit 132 prepares the phonemic HMM with respect to the keyword w, and calculates a score of a path where the phonemic HMM with respect to a keyword model reaches the end frame in the number of frames te from start of importing speech with the method in Patent Literature 2. In this case, a start point frame of the phonemic HMM of a path having a mean local score S at the number of frames te with respect to a keyword model is defined as ts.

The calculating unit 132 calculates a score while incrementing the number of frames te in a time direction. In this case, the calculating unit 132 can skip score calculation and reduce a calculation amount for several frames. The calculating unit 132 uses the mean local score S as a score of the keyword (keyword score).

A keyword model is not limited to modelization in units of phonemes, and can be modeled in units of vocal sounds, mora, phonetic representation, or notation characters. A method for calculating a mean local score is not limited to the method in Patent Literature 2. Acoustic score calculation in units of frames is not limited to a method using feedforward neural network, and a neural network having the recurrent configuration, for example, long short-term memory (LSTM) can be applied to the acoustic score calculation.

By comparing a keyword score with a preliminarily defined threshold, the detecting unit 133 determines whether there is a keyword that has a keyword score exceeding the threshold (step S103). In other words, the detecting unit 133 compares the mean local score S preliminarily prepared with respect to a keyword model with a threshold th with respect to this mean local score S with the following expression (1):

$$th < S \quad (1)$$

When the expression (1) is satisfied, the detecting unit 133 detects the keyword w. When a start point time of the keyword is defined as tms, the keyword w of a section between the start point and the end (tms, te) is detected. As the threshold th, using a development speech data set including a keyword, one maximum value of an F value that is a harmonic mean between a matching ratio and a reproducing ratio is defined to all keywords. In this case, when a value of the threshold th is made higher, a keyword is unlikely to be detected, and when a value of the threshold th is made lower, a keyword is likely to be detected. By multiplying a score by minus one, positive and negative can be inverted. In this case, when a score is lower than a threshold, a keyword is detected.

When there is no keyword exceeding the threshold th (No at step S103), the process goes back to the processing at step S101, and processing for detecting a keyword from subsequent speech data continues.

By contrast, when there is a keyword exceeding the threshold th (Yes at step S103), in other words, when the keyword w is detected, the extending unit 134 extends a feature with respect to the detected keyword section (step S104).

For example, the extending unit 134 uses 256-dimensional output from the second intermediate layer in a neural network used for detection as a feature indicating features of a speaker (speaker feature). For example, the extending unit 134 creates some random patterns that do not exceed a certain range as a bias parameter of neural network output from an input layer and intermediate layers and adds the random patterns so as to change parameters of a neural network. The extending unit 134 acquires a plurality of outputs from the intermediate layer in a plurality of neural networks corresponding to each of the random patterns as an extended speaker feature.

For example, when three sets of random patterns are generated, three pieces of different intermediate layer output (speaker feature) can be obtained with respect to a piece of input. Output of a plurality of intermediate layers may be acquired by preparing a pattern for setting weight of a part of the neural network to zero and the like. The extending unit 134 adapts this kind of processing to a detected keyword section, and extends a speaker feature.

Figure 4:
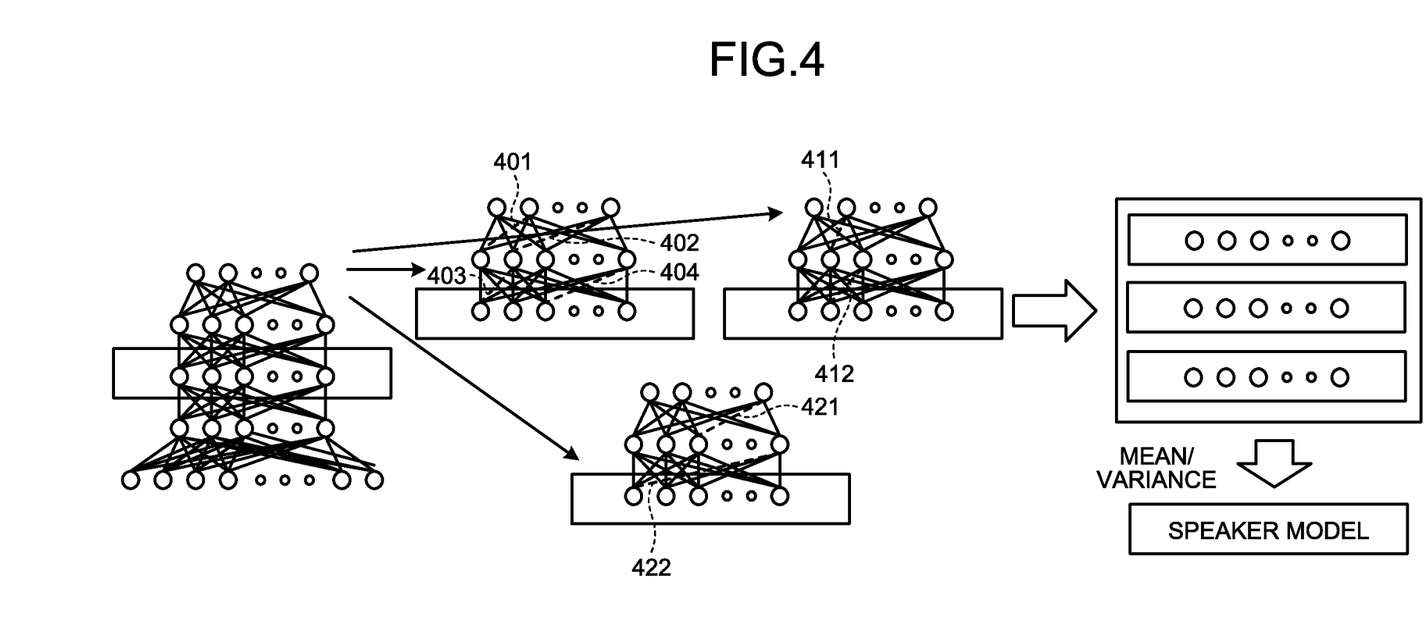
FIG. 4 is a view illustrating a specific example of the processing for creating a model.

FIG. 4 is a view illustrating a specific example of the processing for creating a model. The left end in FIG. 4 illustrates an example of a neural network used for detecting a keyword. The extending unit 134 changes a part of network parameters up to the intermediate layer of the second layer in this neural network. FIG. 4 illustrates examples where, in each of the three patterns, the weight of mutually different parts is defined as 0. For example, in a pattern in the center upper left of FIG. 4, the weight corresponding to connection wires 401 to 404 is changed to 0. In a pattern in the center upper right of FIG. 4, the weight corresponding to connection wires 411 and 412 is changed to 0. In a pattern in the center bottom of FIG. 4, the weight corresponding to connection wires 421 and 422 is changed to 0.

Referring back to FIG. 3, the creating unit 135 creates a speaker model using a plurality of speaker features extended to a keyword section (step S105). For example, the creating unit 135 creates a 256-dimensional Gaussian distribution model having single Gaussian distribution with respect to each dimension of 256-dimensional vectors as a speaker model. The creating unit 135 calculates a mean and variance of the extended speaker features, and constructs a Gaussian distribution model. The creating unit 135 stores the constructed Gaussian distribution model as a speaker model in the storage 122. The right end in FIG. 4 illustrates a state where the creating unit 135 creates a speaker model from a mean and variance of three speaker features.

A method for creating a speaker model is not limited to this. For example, when obtaining input vectors of a plurality of speakers to a neural network or extended speaker feature vectors, the creating unit 135 may learn a neural network for identifying a speaker using the input vectors and the extended speaker feature vectors so as to create a speaker model (learned neural network). In this case, discriminative models such as a support vector machine (SVM) and adaptive boosting (AdaBoost) can be applied as a speaker model. Beyond that, a Gaussian distribution model can be constructed by converting a vector indicating a speaker feature using a neural network as described in Ehsan Variani, Xin Lei, Erik McDermott, Ignacio Lopez Moreno, Javier Gonzalez-Dominguez, "DEEP NEURALWORKS FOR SMALL FOOTPRINT TEXT-DEPENDENT SPEAKER VERIFICATION," in Proc. ICASSP, 2014 (Non Patent Literature 1) for easily identifying a speaker, and calculating a mean, variance, and the like. The creating unit 135 may create a mean vector of vectors indicating a speaker feature as a speaker model.

Figure 5:
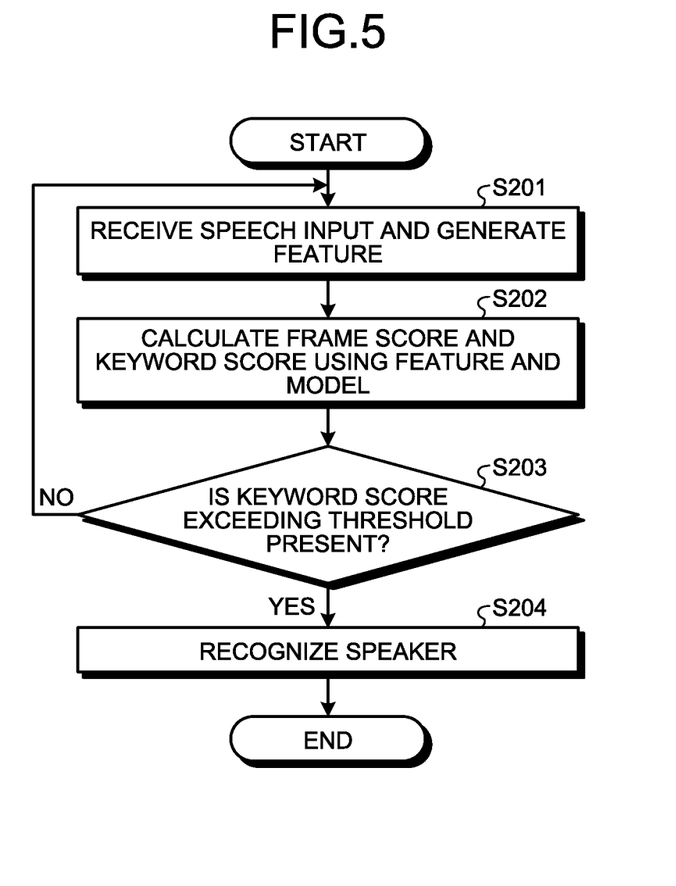
FIG. 5 is a flowchart of recognition processing according to the first embodiment.

The following describes recognition processing performed by the recognition apparatus 100 according to the first embodiment formed in this manner. FIG. 5 is a flowchart illustrating an example of the recognition processing according to the first embodiment. The recognition processing is processing for recognizing a speaker of input speech using a created speaker model. In the recognition processing, a keyword to be detected is detected, and a speaker of the detected keyword is recognized.

Because processing from step S201 to step S203 is the same as that from step S101 to step S103 in FIG. 3 representing processing for creating a model, the explanation is omitted.

When there is a keyword exceeding the threshold th (Yes at step S203), in other words, when the keyword w is detected, the recognizing unit 136 determines likelihood of a speaker using a created speaker model and outputs from an intermediate layer calculated at the time of detecting a keyword (step S204). For example, the recognizing unit 136 inputs outputs from an intermediate layer about all frames in a keyword detection section to Gaussian distribution, and defines the sum of output likelihood as likelihood of a speaker. In this case, the recognizing unit 136 may input outputs from an intermediate layer to Gaussian distribution for each frame so as to obtain likelihood, and may input, after once taking a mean of vectors of all frames, outputs from an intermediate layer to Gaussian distribution so as to obtain likelihood. The recognizing unit 136 outputs, for example, a speaker having the maximum likelihood of a speaker as a recognition result. In this case, when a threshold is provided to likelihood and the likelihood with respect to a plurality of speaker models or a single speaker model is equal to or less than the threshold, a recognition result that any registered speakers are not a speaker of a keyword may be returned.

When a speaker model is identification models such as a neural network, an SVM, and AdaBoost, the recognizing unit 136 can vote an identification result for each frame and output a speaker having the largest number of votes as a recognition result, and may sum speaker class probability or likelihood for each frame. The recognizing unit 136 may calculate a speaker recognition result using a cosine distance with a mean vector.

In this manner, the recognition apparatus according to the first embodiment can extend input speech to a plurality of speaker features, and create a speaker model using these speaker features. Thus, with less data, speaker registration can be effectively executed. When Gaussian distribution and the like are used as a speaker model, two neural networks are not required to be used unlike a conventional case, and one neural network for detecting a keyword is used, thereby reducing a calculation amount.

Second Embodiment

Figure 6:
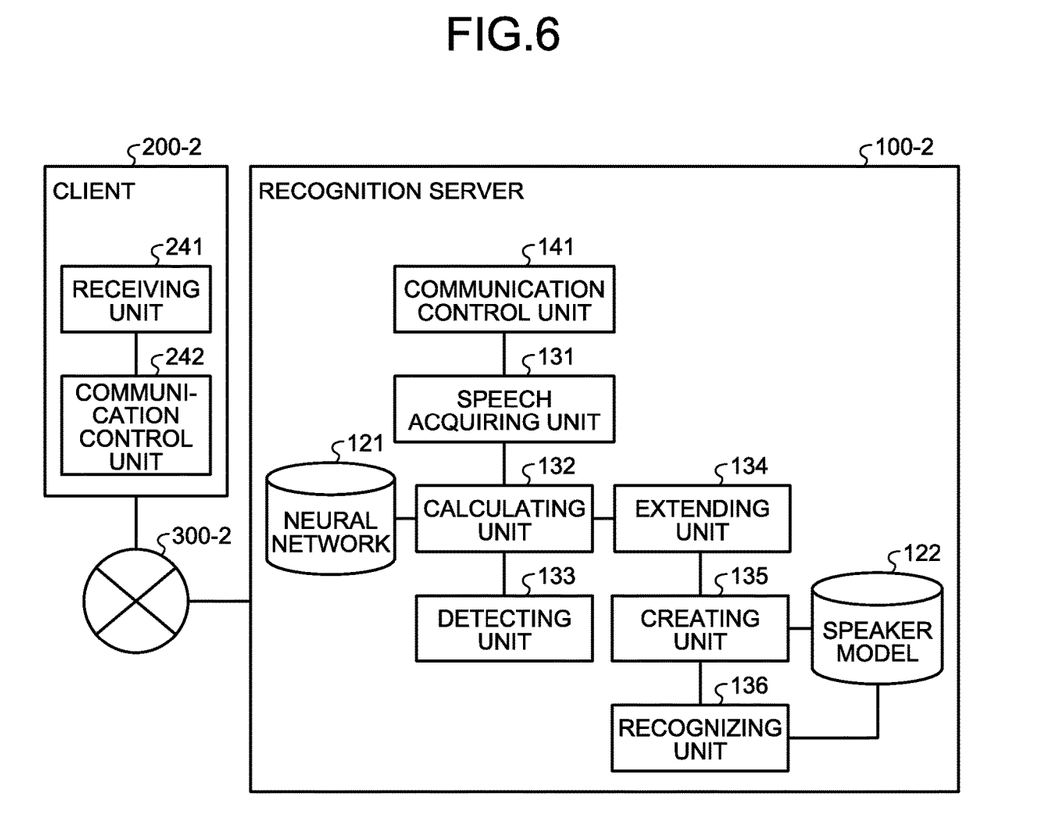
FIG. 6 is a block diagram illustrating a recognition system according to a second embodiment.

A second embodiment describes an example where a recognition system is implemented by a plurality of apparatuses. FIG. 6 is a block diagram illustrating an example of the configuration of the recognition system according to the second embodiment.

As illustrated in FIG. 6, the recognition system according to the second embodiment is formed by connecting a client 200-2 and a recognition server 100-2 through a network 300-2. FIG. 6 illustrates that the number of the respective apparatuses is only one, but the number of the respective apparatuses may be any number.

The network 300-2 may be either a wireless network or a wire network, and may be a network in conformity to any standard. The network 300-2 is, for example, the Internet.

The client 200-2 includes a receiving unit 241 and a communication control unit 242. The receiving unit 241 receives input of speech data generated by, for example, a microphone. The communication control unit 242 controls communication with an external apparatus such as the recognition server 100-2. For example, the communication control unit 242 transmits received speech data to the recognition server 100-2. The communication control unit 242 receives a speaker recognition result with respect to the transmitted speech data from the recognition server 100-2.

The recognition server 100-2 includes the storages 121 and 122, the speech acquiring unit 131, the calculating unit 132, the detecting unit 133, the extending unit 134, the creating unit 135, the recognizing unit 136, and a communication control unit 141. The recognition server 100-2 differs from the recognition apparatus 100 according to the first embodiment in that the communication control unit 141 is added.

The communication control unit 141 controls communication with an external apparatus such as the client 200-2. For example, the communication control unit 141 receives speech data transmitted from the client 200-2. The communication control unit 141 transmits a speaker recognition result with respect to the speech data to the client 200-2.

For example, the speech acquiring unit 131 receives input speech passed from the communication control unit 141, and converts the received input speech into a feature and outputs the feature. The subsequent processing for creating a model and recognition processing are the same as the processing in the first embodiment.

Figure 7:
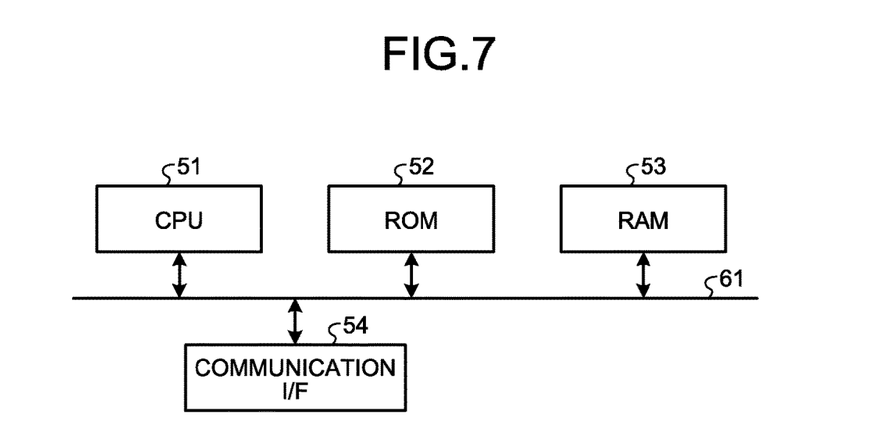
FIG. 7 is a view illustrating the hardware configuration of a client according to the second embodiment.

The following describes the hardware configuration of the client 200-2 according to the second embodiment with reference to FIG. 7. FIG. 7 is an explanatory view illustrating an example of the hardware configuration of the client 200-2 according to the second embodiment.

The client 200-2 according to the second embodiment includes a controller such as a CPU 51, storage apparatuses such as a read only memory (ROM) 52 and a RAM 53, a communication interface (I/F) 54 that connects to a network and performs communication, and a bus 61 that connects each of the units.

The recognition server 100-2 can be implemented as, for example, a server computer. The recognition server 100-2 may be implemented as a cloud server executing processing on a cloud. The client 200-2 can be implemented as an embedded system embedded in personal computers and various kinds of electronic devices, and as a portable information terminal such as tablet computers, smartphones, portable cellular phones, and personal digital assistances (PDAs). The client 200-2 and the recognition server 100-2 can exchange data through the network 300-2.

The recognition system according to the second embodiment can recognize a speaker from speech data (speech signal) that is generated using a microphone and the like provided to the client 200-2. For example, the client 200-2 transmits speech data that is generated using a microphone and the like provided to the client 200-2 to the recognition server 100-2 through the network 300-2. The recognition server 100-2 recognizes a speaker from speech data received from the client 200-2 using a speaker recognition function, and transmits the recognition result to the client 200-2 through the network 300-2. Thus, the client 200-2 can start, for example, specific operation depending on a recognized speaker.

In this manner, in the second embodiment, speech acquired by the client 200-2 is transmitted to the recognition server 100-2, and speaker recognition is executed by the recognition server 100-2. A method in which each of the apparatuses (the client 200-2 and the recognition server 100-2) disperses and executes a function of recognizing a speaker is not limited to an example illustrated in FIG. 6, and any method may be used for dispersing the function.

For example, the client 200-2 may transmit not speech data but a feature generated using speech data (for example, a speech feature vector string) to the recognition server 100-2. In this case, the recognition server 100-2 can detect a keyword from the received feature and transmit the keyword to the client 200-2.

In this manner, in the second embodiment, an embodiment of a system that includes a plurality of apparatuses such as a client server system enables the same speaker recognition function as that of the first embodiment to be implemented.

Modification

A recognition system can be applied to, for example, an application that executes desirable operation depending on a detected keyword and a recognized speaker (user). Generally, use of this kind of application can be started after a speaker is registered. Thus, in order to enable use of an application to be started earlier, it is preferable that speaker registration be executed more effectively.

In a modification, speaker registration can be simply executed and speaker registration can be completed earlier. For example, in the modification, at least one of the number of changed network parameters, the number of patterns applied at the time of changing, and the like can be designated. The extending unit 134 changes network parameters along with the designation.

Figure 8:
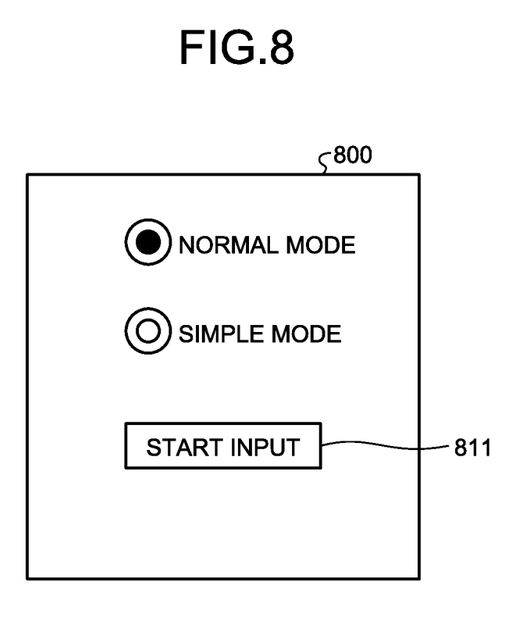
FIG. 8 is a view illustrating an example of a designated screen used in a modification.

FIG. 8 is a view illustrating an example of a designated screen used in the modification. As illustrated in FIG. 8, on a designated screen 800, either a normal mode or a simple mode can be selected. The simple mode is a mode for changing network parameters so that a processing load is lower than that of the normal mode. For example, in the simple mode, at least one of the number of changed network parameters and the number of applied patterns is made less than that of the normal mode. When a button for starting input 811 is pressed after a mode is designated, speech input and speaker registration are started along with the designated mode.

For example, it is assumed that a system according to the present embodiment is applied to a controller that uses respective speech of a plurality of users for different control. The system is used in a case where, for example, even when a customer and a store staff member utter the same keyword in a store, control and the like of an apparatus can be performed only if the keyword is recognized as the keyword that the staff member utters. Control of an apparatus indicates that control for lighting, air conditioning, and the like in a store is output. For example, when recognizing words such as "turn on/off (a light)" and "turn up/down (temperature)" as words that a staff member utters, an output unit included in a controller enables the words to be output as control instructions. The output unit can determine, using a speaker model obtained by speech of a user and learning of the speech, whether a user is a predetermined user.

By contrast, for example, when a customer tries a new function, a simple mode may be used in a situation where the customer would like to temporarily make simple registration and the like. For example, when a customer would like to try whether a function of an electronic device such as a function: "turn on/off a timer" operates, a simple mode may be used. When speaker registration is made in a time shorter than a regular time, a user preliminarily selects a simple mode so as to reduce the time of speaker registration.

Even when a staff member is one, if speaker registration is made, whether speech is the speech of the staff member can be distinguished. The selection of modes is not limited to two, but three or more modes may be prepared by recognition accuracy and a time of speaker registration.

A computer program executed by each of the apparatuses (the recognition apparatus, the recognition server, and the client) according to the first and second embodiments is preliminarily incorporated in a non-volatile memory, a ROM, or the like so as to be provided.

The computer program executed by each of the apparatuses according to the first and second embodiments may be a file in an installable format or in an executable format, and be recorded in computer-readable recording media such as a compact disc read only memory (CD-ROM), a flexible disk (FD), a compact disc recordable (CD-R), and a digital versatile disc (DVD) so as to be provided as a computer program product.

The computer program executed by each of the apparatuses according to the first and second embodiments may be stored in a computer connected to a network such as the Internet and be downloaded through the network so as to be provided. The computer program executed by each of the apparatuses according to the first and second embodiments may be provided or distributed through a network such as the Internet.

The computer program executed by each of the apparatuses according to the first and second embodiments enables a computer to function as each unit of the recognition apparatus described above. In this computer, a CPU can load the computer program on a main storage apparatus (main memory) from computer-readable storage media and execute the computer program.

As described above, according to the first and second embodiments, speaker registration can be effectively executed with less data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system for creating a speaker model, the system comprising:
one or more processors configured to:
generate second neural networks, each of the second neural networks being generated by changing a part of network parameters from an input layer to a predetermined intermediate layer of a first neural network based on one of a plurality of patterns, the first neural network being a neural network for detecting one or more words without recognizing a speaker;
input a piece of speech into the each of the second neural networks so as to obtain a plurality of outputs from the intermediate layer; and
create a speaker model that receives a speaker feature comprising vocal sounds as input and outputs a recognized speaker by inputting each of the outputs as the speaker feature.

2. The system for creating a speaker model according to claim 1, wherein the one or more processors are further configured to:

receive speech and converts the speech into a feature;

input the feature to a neural network and calculate a score that represents likelihood indicating whether the feature corresponds to one or more predetermined words; and detect the one or more words from the speech using the score.

3. The system for creating a speaker model according to claim 2, wherein the neural network used for calculating the score is the same as the first neural network.

4. The system for creating a speaker model according to claim 2, wherein the neural network used for calculating the score is different from the first neural network.

5. The system for creating a speaker model according to claim 1, wherein the one or more processors create Gaussian distribution represented by a mean and variance of the outputs as the speaker model.

6. The system for creating a speaker model according to claim 1, wherein the one or more processors create the speaker model by learning using speech of a speaker and the outputs.

7. The system for creating a speaker model according to claim 1, wherein the one or more processors create the speaker model for each partial section included in the one or more words.

8. The system for creating a speaker model according to claim 1, wherein the one or more processors change, out of the network parameters from the input layer to the intermediate layer, weight of a part of the network parameters.

9. The system for creating a speaker model according to claim 1, wherein the one or more processors add, out of the network parameters from the input layer to the intermediate layer, a random value to bias of a part of the network parameters.

10. The system for creating a speaker model according to claim 1, wherein the network parameters include bias term parameters with respect to an input value to each layer from the input layer to the intermediate layer, and the one or more processors add a random value to a part of the bias term parameters.

11. A recognition system comprising:

one or more processors configured to:

receive speech and converts the speech into a feature;

input the feature to a first neural network and calculate a score that represents likelihood indicating whether the feature corresponds to one or more predetermined words;

detect the one or more words from the speech using the score;

generate second neural networks, each of the second neural networks being generated by changing a part of network parameters from an input layer to a predetermined intermediate layer of the first neural network based on one of a plurality of patterns, the first neural network being a neural network for detecting one or more words without recognizing a speaker, input a piece of the speech into the each of the second neural networks so as to obtain a plurality of outputs from the intermediate layer;

create a speaker model that receives a speaker feature comprising vocal sounds as input and outputs a recognized speaker by inputting each of the outputs as the speaker feature; and recognize the speaker using the speaker model.

12. The recognition system according to claim 11, wherein the one or more processors input the outputs from the intermediate layer with respect to speech input for recognition to the speaker model so as to recognize the speaker.

13. A computer program product having a non-transitory computer readable medium including programmed instructions stored therein, wherein the instructions, when executed by a computer, cause the computer to perform:

generating second neural networks, each of the second neural networks being generated by changing a part of network parameters from an input layer to a predetermined intermediate layer of a first neural network based on one of a plurality of patterns, the first neural network being a neural network for detecting one or more words without recognizing a speaker, inputting a piece of speech into the each of the second neural networks so as to obtain a plurality of outputs from the intermediate layer; and creating a speaker model that receives a speaker feature as input and outputs a recognized speaker by inputting each of the outputs as the speaker feature.

14. A controller comprising:

one or more processors configured to:

generate second neural networks, each of the second neural networks being generated by changing a part of network parameters from an input layer to a predetermined intermediate layer of a first neural network based on one of a plurality of patterns, the first neural network being a neural network for detecting one or more words without recognizing a speaker, input a piece of speech into the each of the second neural networks so as to obtain a plurality of outputs from the intermediate layer; and create a speaker model that receives a speaker feature comprising vocal sounds as input and outputs a recognized speaker by inputting each of the outputs as the speaker feature;

acquire speech of a user and detect one or more predetermined words;

determine whether the user is a predetermined user using the speaker model; and output, when the user is the predetermined user, a control instruction that is defined to the one or more words.

15. The controller according to claim 14, wherein the one or more processors determine whether the user is a predetermined user using a speaker model obtained by speech of the user and learning of the speech.

16. The controller according to claim 15, wherein the speaker model is created by learning that uses a plurality of outputs obtained from speech of the user and an extended model.

* * * * *

UNITED STATES PATENT AND TRADEMARK OFFICE
CERTIFICATE OF CORRECTION

| | |
|---|---|
| PATENT NO. | : 11,495,235 B2 |
| APPLICATION NO. | : 16/296410 |
| DATED | : November 8, 2022 |
| INVENTOR(S) | : Hiroshi Fujimura |

It is certified that error appears in the above-identified patent and that said Letters Patent is hereby corrected as shown below:

In the Claims

Claim 2, Column 13, Line 1, "converts" should read as --convert--.

Claim 11, Column 13, Line 43, "converts" should read as --convert--.

Signed and Sealed this
Fifteenth Day of October, 2024

Katherine Kelly Vidal
*Director of the United States Patent and Trademark Office*